(12) United States Patent
Diehl et al.

(10) Patent No.: US 11,174,889 B2
(45) Date of Patent: Nov. 16, 2021

(54) JOINING ELEMENT

(71) Applicant: PROFIL Verbindungstechnik GmbH & Co. KG, Friedrichsdorf (DE)

(72) Inventors: Oliver Diehl, Usingen (DE); Christian Sowa, Muhlheim/Main (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 0 days.

(21) Appl. No.: 16/862,929

(22) Filed: Apr. 30, 2020

(65) Prior Publication Data
US 2020/0347870 A1 Nov. 5, 2020

(30) Foreign Application Priority Data

May 3, 2019 (DE) .......................... 102019111484.5

(51) Int. Cl.
*F16B 37/06* (2006.01)
*B23P 19/06* (2006.01)

(52) U.S. Cl.
CPC .......... *F16B 37/062* (2013.01); *B23P 19/062* (2013.01)

(58) Field of Classification Search
CPC F16B 25/0094; F16B 26/106; Y10T 29/5116; Y10T 29/5343; Y10T 29/5118; Y10T 29/49943; Y10T 29/49957; Y10T 29/49956
See application file for complete search history.

(56) References Cited

U.S. PATENT DOCUMENTS

| 5,528,812 A * | 6/1996 | Muller | F16B 37/065 |
| | | | 29/432.2 |
| 7,341,413 B2 * | 3/2008 | Morris | B21J 15/025 |
| | | | 29/432.2 |
| 9,849,549 B2 * | 12/2017 | Diehl | B23P 19/00 |
| 2003/0175095 A1 * | 9/2003 | Clarke | B21J 15/025 |
| | | | 411/501 |

FOREIGN PATENT DOCUMENTS

| DE | 732450 A | 3/1943 |
| DE | 2249772 A1 | 9/1973 |
| DE | 4213862 A1 | 10/1993 |
| DE | 102011119596 A1 | 5/2013 |
| DE | 102012001068 A1 | 7/2013 |
| EP | 0049218 A2 | 8/1981 |
| EP | 0241299 A2 | 10/1987 |
| EP | 2292940 B1 | 10/2015 |
| JP | 5791980 B2 | 1/2013 |
| WO | 0173305 A1 | 10/2001 |

* cited by examiner

*Primary Examiner* — Jason L Vaughan
*Assistant Examiner* — Amanda Kreiling
(74) *Attorney, Agent, or Firm* — Gregory J. Gore, Esq.

(57) ABSTRACT

The invention relates to a joining element comprising a shaft to be placed into a component; a head provided at a first end of the shaft; and a punching element attached in a losable manner to a second end of the shaft remote from the head.

15 Claims, 3 Drawing Sheets

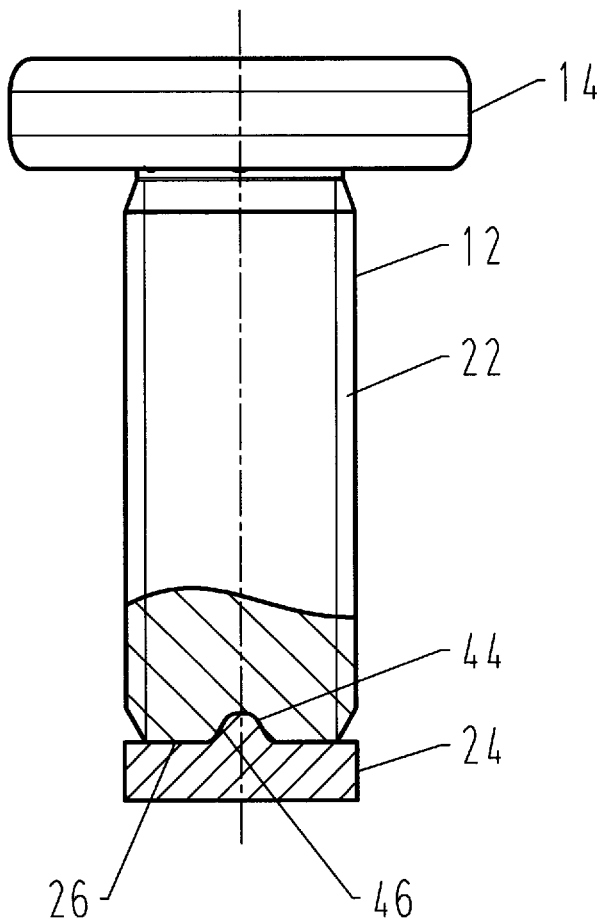

JOINING ELEMENT

Figure 1:
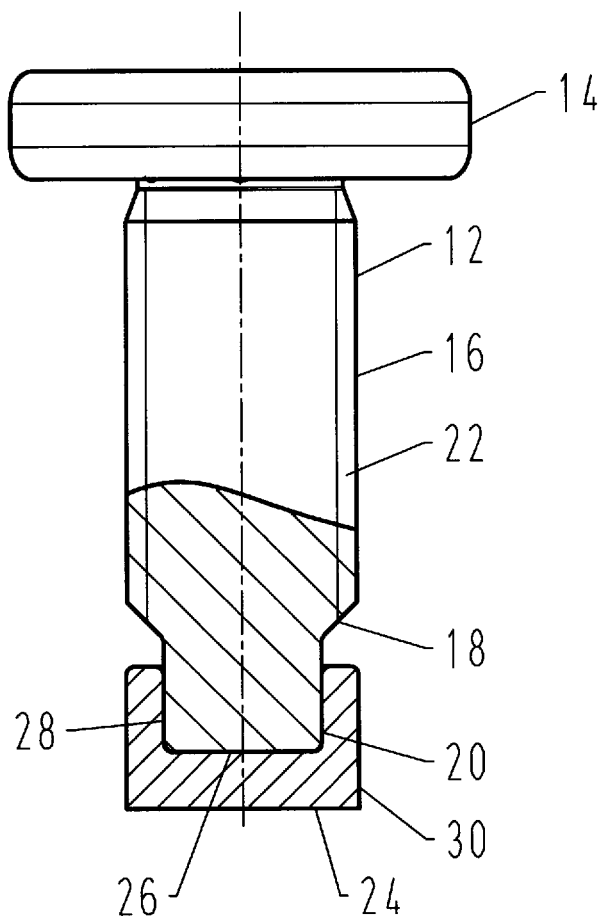

The invention relates to a joining element, in particular to a self-punching joining element.

Self-punching joining elements are generally known and are characterized in that, on a placement into a component, they themselves punch the passage in the component necessary for this purpose. A prepunching of the component can thus be omitted. One example of such a self-punching joining element is a punching rivet nut that can be placed into a component in a particularly simple manner since it forms its passage through the component and is riveted to the latter in one workstep, so-to-say by one stroke.

The placement of a joining element into a component, in contrast, proves to be more problematic when the joining element has an external thread and in particular forms a threaded bolt section and the joining element is to be guided through the component with the external thread or threaded bolt section at the front. The component conventionally has to be prepunched for this purpose so that the external thread of the joining element is not damaged on the placement into the component. Two worksteps are therefore necessary, namely a prepunching of the component and a placement of the joining element into the component, wherein there is the additional difficulty with the placement of the joining element that the joining element has to be correctly aligned with the prepunched hole on the entry into the latter in order to avoid damage to its external thread.

It is therefore the underlying object of the invention to provide a joining element that can be placed into a component in a self-punching manner without damaging a possibly present external thread of the joining element in so doing.

A joining element having the features of claim 1 is provided to satisfy the object.

The joining element in accordance with the invention comprises a shaft to be placed into a component; a head provided at a first end of the shaft; and a punching element attached in a losable manner to a second end of the shaft remote from the head.

If the joining element is driven into a component in a punching process carried out by means of a punching apparatus, the punching element makes its way through the component while releasing a punching slug, wherein it protects an external thread possibly formed at the shaft. Due to the punching element, the joining element therefore becomes a self-punching joining element.

"Attached in a losable manner" in this connection means that the punching element is so fixedly connected to the shaft that it normally cannot be unintentionally released therefrom, in particular not if the joining element is transported in the form of bulk material or is supplied to the punching apparatus, but that said punching element can be separated from the shaft on the application of a specific force that is, for example, exerted onto the punching element when the component with the joining element placed therein is raised from a punch die and the punching element gets caught at the punch die. The force to be applied for the separation of the punching element and the shaft can, for example, be in a range from 10 N to 50 N.

Advantageous embodiments of the invention can be seen from the dependent claims, from the description and from the drawing.

For a losable attachment of the punching element to the shaft, the punching element can be connected to the shaft in a bonded, force-transmitting and/or form-fitted manner. A bonded connection can, for example, be implemented by adhesive bonding or soldering. Suitable latching means are suggested for a form-fitted connection, for example, at least one latch recess of the shaft into which at least one latch projection of the punching element engages or vice versa. A force-transmitting connection of the punching element and the shaft can be implemented particularly simply and inexpensively, for example by pressing the punching element onto the shaft.

The punching element is advantageously formed from a harder material than the shaft for a particularly good protection of the shaft and of an external thread possibly provided thereat during the punching process.

In accordance with an embodiment, the shaft tapers toward its second end. The tapering of the shaft is in particular advantageous when the punching element is cap-shaped and at least partly surrounds the shaft in the region of its second end since, due to the tapering of the shaft, a minimal radial overhang of the punching element can be implemented beyond a maximum radial extent of the shaft despite a sufficient strength of the punching element and the formation of an undesirably large passage in the component can thereby be prevented. A cap-shaped punching element can be particularly easily attached to the shaft, for example pressed onto it, and particularly effectively protects the shaft during the punching process.

For example, if the shaft does not taper in the direction of its second end, the punching element can alternatively be solely attached, for example adhesively bonded or soldered, to an end face formed at the second end of the shaft. In this case, the punching element can be plate-like or plate-shaped.

To better fix such a punching element to the end face, in particular to avoid a sliding off of the punching element from the end face during the punching process, the shaft can form an end face at its second end, said end face being provided with a recess into which a projection of the punching element engages. For example, the recess can be a latch recess and the projection can be a latch projection, which would in principle make it possible to dispense with an adhesive bonding or soldering of the punching element to the shaft. However, a latch projection of the punching element can generally also be adhesively bonded or soldered in a latch recess of the shaft.

As already mentioned, the shaft can be provided with an external thread. In this respect, the external thread can extend, starting from the head, in the direction of the second end, in particular up to a tapering end section of the shaft. With the exception of the tapering end section of the shaft on which a cap-shaped punching element can, for example, be seated, the total shaft can therefore be provided with an external thread.

The joining element can, for example, be a threaded bolt, a ground bolt, or a welded bolt.

For an effective protection of the external thread during a punching process, it is sufficient if an outer diameter of the punching element is larger than an outer diameter of the external thread by an amount that is in a range from 10 μm to 1000 μm, preferably 10 μm to 500 μm, and particularly preferably 10 μm to 100 μm. In other words, the outer diameter of the punching element is only slightly larger than the outer diameter of the external thread. This has the advantage that the material of the component can flow into the thread turns of the external thread when the head of the joining element is pressed onto the component at the end of the punching process, whereby the joining element is securely held in the component.

A further subject of the invention is a punching arrangement comprising a joining element in accordance with the invention; and a punch die for supporting a component into which the joining element is to be placed, wherein the punch die has a hole which widens in a punching direction and into which the shaft of the joining element dips on the placement of the joining element into the component. In this respect, a minimum diameter of the hole is adapted to a diameter of the punching element such that the punching element can be pressed into the hole during a punching process; however, on a withdrawal of the shaft from the hole, said punching element gets caught at a wall of the punch die bounding the hole and releases from the joining element. The advantages described above can be correspondingly achieved by the punching arrangement.

The hole of the die can, for example, widen in step form, i.e. it can therefore form a step or a shoulder that particularly effectively ensures that the punching element gets caught and releases from the shaft on a withdrawal of the shaft from the hole.

So that a possibly present external thread of the joining element is not damaged on the dipping into the hole of the punch die, but it is simultaneously ensured that the punching element releases from the shaft on the raising of the component and the joining element placed therein from the punch die, the minimum diameter of the hole is larger than an outer diameter of the external thread of the joining element and smaller than an outer diameter of the punching element.

Figure 2:
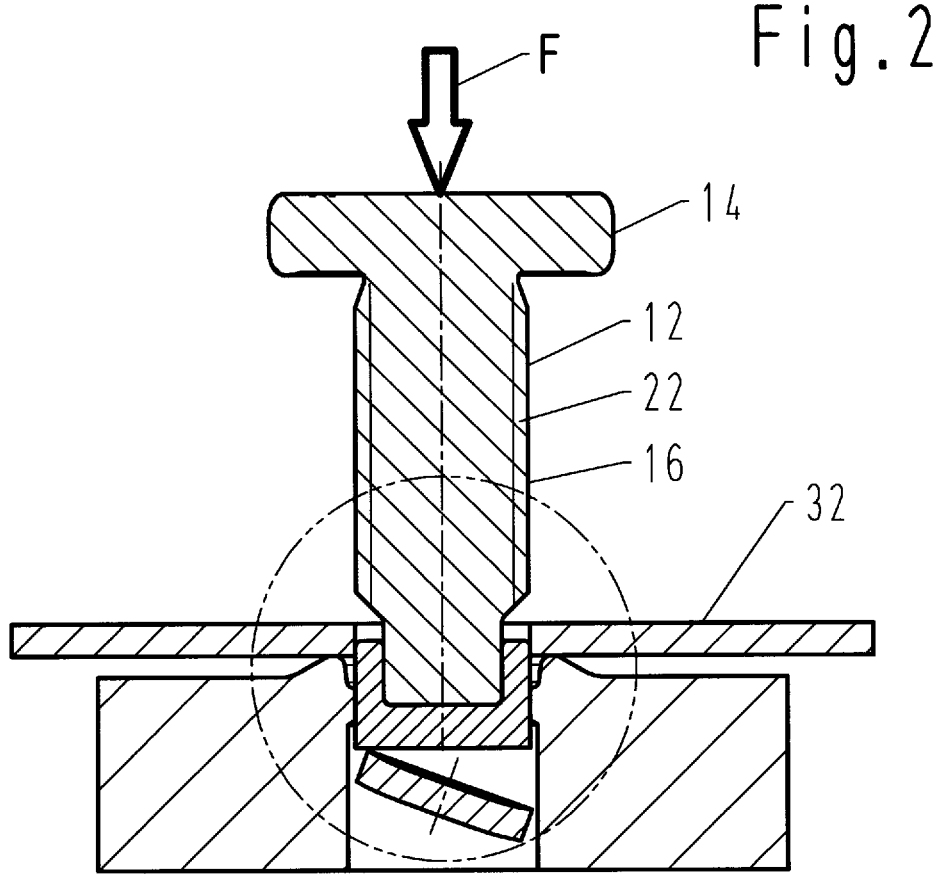
Figure 2:
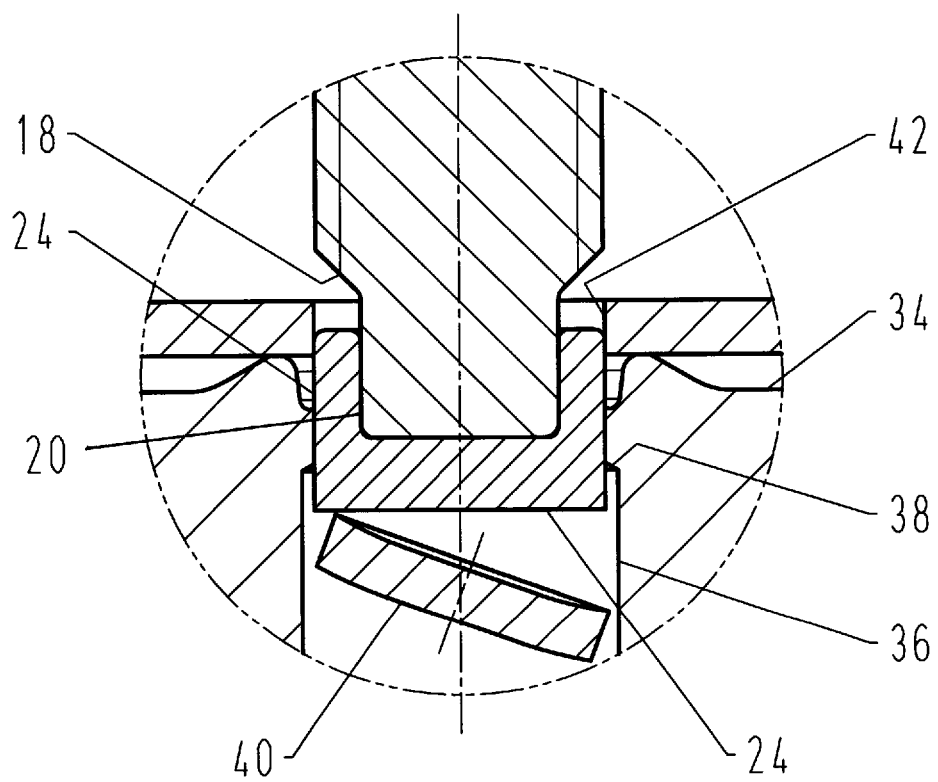

The invention will be described in the following purely by way of example with reference to possible embodiments and to the enclosed drawing. There are shown:

FIG. 1 a joining element in accordance with a first embodiment of the invention;

FIG. 2 a punching arrangement in accordance with the invention during a punching process; and FIG. 3 a joining element in accordance with a second embodiment of the invention.

In FIG. 1, a first embodiment of a joining element 10 is shown that has a shaft 12 whose first end is adjoined by a head 14. The shaft 12 tapers in the region of its second end remote from the head 14. Specifically, the shaft merges, starting from a main section 16, into a conical intermediate section 18 adjoined by a cylindrical end section 20 that has an outer diameter that is reduced with respect to an outer diameter of the main section 16.

Starting from the head 14, the shaft 12 is provided with an external thread 22 over the total length of the main section 16.

The joining element 10 can, for example, be a threaded bolt, a ground bolt, or a welded bolt.

A cap-shaped punching element 24 is pressed onto the end section 20 and covers an end face 26 of the shaft 12 remote from the head 14 and at least regionally covers a jacket surface 28 of the end section 20. The press fit between the punching element 24 and the end section 20 is selected such that the punching element 24 cannot unintentionally release from the shaft 12 during a transport of the joining element 10 in the form of bulk material or during the supply of the joining element 10 to a punching apparatus, but a separation of the punching element 24 and the shaft 12 is nevertheless possible after the end of a punching process as will be explained in more detail in the following. Specifically, the punching element 24 can be removed from the end section 20 on the application of a force of at least 10 N, for example.

Corresponding to the end section 20, the punching element 24 has a cylindrical jacket surface 30. An outer diameter of the punching element 24 is in this respect selected slightly larger than an outer diameter of the external thread 22. Specifically, the outer diameter of the punching element 24 is larger than the outer diameter of the external thread by an amount that is in a range from 10 μm to 1000 μm, preferably 10 μm to 500 μm, and particularly preferably 10 μm to 100 μm.

The punching element 24 can be formed from a harder material than the shaft 12.

The joining element 10 is a self-punching joining element 10 as will now be explained in more detail with reference to FIG. 2.

The joining element 10 is supplied in a manner known per se to a punching apparatus and is pressed therein by means of a tool, not shown, on the application of a force F in a range of several 1000 N to a component 32, for example a metal sheet, into which the joining element 10 is to be placed. During the punching process, the component 32 is supported by a punch die 34 in which a hole 36 is formed that is aligned with the joining element 10.

The punching element 24 passes through the component 32 during the punching process, wherein a punching slug 40 is separated from the component 32 and falls into the hole 36. Due to the outer diameter of the punching element 24 that is slightly larger with respect to the external thread 22, the passage 42 produced in the component 32 by the punching element 24 is likewise slightly wider than the external thread 22 so that the shaft 12 can dip into the component 12 without damage to the external thread 22 until the head 14 comes to lie on the component 32. A punching force lasting for a specific time period now has the effect that the material of the component 32 bounding the passage 42 starts to flow and comes into engagement with the external thread 22, whereby the joining element 10 is fixed to the component 32.

In this situation, the punching element 24 is still seated on the end section 20 of the shaft 12. If the component 32 with the joining element 10 placed therein is now raised from the punch die 34, the punching element 24, from the side remote from the component 32, thus abuts the wall of the punch die 34 bounding the hole 36 and is scraped off from the shaft 12 of the joining element 10 by said wall.

For this purpose, the hole 36 widens while forming a shoulder 38 in the direction of the interior of the punch die 34. A minimum diameter of the hole 36 is in this respect adapted to the outer diameter of the punching element 24 such that the punching element 24 can indeed be pressed through the hole 36 into the punch die 34 during a punching process; however, on a pulling of the shaft 12 out of the punch die 34, said punching element 24 gets caught at the shoulder 38 of the punch die 34 and is removed from the shaft. The minimum diameter of the hole 36 is therefore slightly smaller than the outer diameter of the punching element 24, but simultaneously larger than the outer diameter of the external thread 22 of the joining element 10 so that said external thread 22 is not damaged on the dipping of the shaft 12 into the hole 36.

The released punching element 24 can subsequently be removed from the hole 36 of the punch die 34 together with the punching slug 40.

A second embodiment of a joining element 10 is shown in FIG. 3 that, on the one hand, differs from the first embodiment described above in that the shaft 12 does not taper significantly in the region of its second end remote from the head 14 and the external thread 22 extends substantially up to the second end of the shaft 12. On the other hand, the punching element 24 is plate-shaped here so that it only covers the end face 26 of the shaft 12. The losable attachment of the punching element 24 to the shaft 12 in this case takes place by means of an adhesive connection or a solder connection.

Alternatively or additionally, it is also conceivable to insert a latch recess 44 into the end face 26 of the shaft 12 into which a complementary latch projection 46 of the punching element 24 engages.

As in the first embodiment, the outer diameter of the punching element 24 is selected slightly larger than the outer diameter of the external thread 22 in accordance with the second embodiment so that the punching element 24 punches a passage 42 into the component 32 that enables a damage-free passing of the component 32 through the external thread 22, but the punching element 24 can nevertheless pass through the hole 36 of the punch die 34 and gets caught at the punch die 34 on the pulling of the shaft 12 out of the hole 36 in order to be released from the shaft 12.

REFERENCE NUMERAL LIST 10 joining element
12 shaft
14 head
16 main section
18 intermediate section
20 end section
22 external thread
24 punching element
26 end face
28 jacket surface
30 jacket surface
32 component
34 punch die
36 hole
38 shoulder
40 punching slug
42 passage
44 latch recess
46 latch projection
F force

The invention claimed is:

1. A joining element comprising
a shaft to be placed into a component;
a head provided at a first end of the shaft;
a punching element attached in a losable manner to a second end of the shaft remote from the head;
wherein the shaft is provided with an external thread; and
wherein an outer diameter of the punching element is larger than an outer diameter of the external thread by an amount that is in a range from 10 µm to 1000 µm.

2. The joining element in accordance with claim 1, wherein the punching element is connected to the shaft in at least one of a bonded, force-transmitting and form-fitted manner.

3. The joining element in accordance with claim 1, wherein the punching element is pressed onto the shaft.

4. The joining element in accordance with claim 1, wherein the punching element is formed from a harder material than the shaft.

5. The joining element in accordance with claim 1, wherein the shaft forms an end face at its second end, said end face being provided with a recess into which a projection of the punching element engages.

6. The joining element in accordance with claim 1, wherein the shaft tapers toward its second end.

7. The joining element in accordance with claim 1, wherein the shaft has a tapered end section.

8. The joining element in accordance with claim 1, wherein the punching element is cap-shaped and at least partly surrounds the shaft in the region of its second end.

9. The joining element in accordance with claim 1, wherein the external thread extends, starting from the head, in the direction of the second end.

10. The joining element in accordance with claim 1, wherein the external thread extends, starting from the head, up to a tapering end section of the shaft.

11. The joining element in accordance with claim 1, wherein an outer diameter of the punching element is larger than an outer diameter of the external thread by an amount that is in a range from 10 µm to 500 µm.

12. The joining element in accordance with claim 1, wherein an outer diameter of the punching element is larger than an outer diameter of the external thread by an amount that is in a range from 10 µm to 100 µm.

13. The joining element in accordance with claim 1, wherein the joining element is one of a threaded bolt, a ground bolt, and a welded bolt.

14. A punching arrangement comprising a joining element; and a punch die for supporting a component into which the joining element is to be placed, the joining element comprising a shaft to be placed into a component; a head provided at a first end of the shaft; and a punching element attached in a losable manner to a second end of the shaft remote from the head; and the punch die having a hole which widens in a punching direction and into which the shaft of the joining element dips on the placement of the joining element into the component; wherein a minimum diameter of the hole is adapted to an outer diameter of the punching element such that the punching element can be pressed into the hole during a punching process; however, on a withdrawal of the shaft from the hole, said punching element gets caught at a wall of the punch die bounding the hole and releases from the joining element; and wherein the minimum diameter of the hole is larger than an outer diameter of an external thread of the joining element and smaller than an outer diameter of the punching element.

15. The punching arrangement in accordance with claim 14, wherein the hole widens in step form.

* * * * *